(12) United States Patent
Younce

(10) Patent No.: US 11,046,226 B1
(45) Date of Patent: Jun. 29, 2021

(54) PIVOTING HANDRAIL WITH SAFETY LATCH

(71) Applicant: Donald Younce, Stockton, MO (US)

(72) Inventor: Donald Younce, Stockton, MO (US)

( * ) Notice: Subject to any disclaimer, the term of this patent is extended or adjusted under 35 U.S.C. 154(b) by 0 days.

(21) Appl. No.: 17/212,429

(22) Filed: Mar. 25, 2021

Related U.S. Application Data

(60) Provisional application No. 63/001,574, filed on Mar. 30, 2020.

(51) Int. Cl.
*B60N 3/02* (2006.01)
*B60P 3/36* (2006.01)

(52) U.S. Cl.
CPC .............. *B60N 3/023* (2013.01); *B60P 3/36* (2013.01)

(58) Field of Classification Search
CPC ... B60N 3/02; B60N 3/023; B60P 3/32; B60P 3/36; B62D 33/0612; E04F 11/18
USPC ......................................................... 296/1.02
See application file for complete search history.

(56) References Cited

U.S. PATENT DOCUMENTS

| 4,261,550 A | 4/1981 | Gregory |
| 4,976,455 A * | 12/1990 | Brammer, Sr. ........... B60P 3/36 16/319 |
| 5,076,547 A | 12/1991 | Osterholm |
| 5,116,025 A | 5/1992 | Kiniry |
| 6,425,572 B1 | 7/2002 | Lehr |
| 6,974,134 B1 * | 12/2005 | Macri .................... B60N 3/023 16/412 |
| 7,007,366 B1 | 3/2006 | Eby |
| 7,011,297 B1 | 3/2006 | Guillot |
| 10,946,780 B2 * | 3/2021 | Bacon .................... B60N 3/026 |
| 2007/0204437 A1 * | 9/2007 | Hartmann, Jr. ....... B60Q 1/2669 16/444 |

* cited by examiner

*Primary Examiner* — Jason S Daniels
(74) *Attorney, Agent, or Firm* — Boudwin Intellectual Property; Daniel Boudwin

(57) ABSTRACT

A pivoting handrail with a safety latch is provided. The device includes a handrail having a first end opposite a second end. The first end is pivotally affixed to an upper bracket and the second end is pivotally affixed to a lower bracket. An upper pin is affixed to the first end, the upper pin slidably disposed within a first channel within the upper bracket. A lower pin is affixed to the second end, the lower pin slidably disposed within a second channel within the lower bracket. The handrail is selectively movable between an in-use position and a stowed position upon elevation of the handrail. A safety latch is affixed to a deadbolt, wherein the safety latch selectively moves the deadbolt between an extended position and a retracted position. When in the extended position, the deadbolt extends into the second channel to displace the lower pin from the second channel.

20 Claims, 4 Drawing Sheets

PIVOTING HANDRAIL WITH SAFETY LATCH

CROSS REFERENCE TO RELATED APPLICATIONS

This application claims the benefit of U.S. Provisional Application No. 63/001,574 filed on Mar. 30, 2020. The above identified patent application is herein incorporated by reference in its entirety to provide continuity of disclosure.

BACKGROUND OF THE INVENTION

The present invention relates to handrails for recreational vehicles (RVs). More particularly, the present invention pertains to a pivoting handrail with a safety latch to allow a user to operate the pivoting handrail from within an interior of the recreational vehicle.

Many recreational vehicles include handrails adjacent to the door of the recreational vehicle. These handrails typically extend or pivot to an in-use position extending substantially perpendicularly from the recreational vehicle and can be stowed prior to driving the recreational vehicle. Often, these handrails pivot and lock in a position over the front of the recreational vehicle door, which can prevent the recreational vehicle door from opening. This can pose a substantial safety risk, as in the event of an emergency, the user may not be able to open the door and exit the vehicle. Alternate exits may be inaccessible during the emergency, resulting in the user being trapped within the vehicle. Therefore, a handrail system that can be unlocked and pivoted from an interior of the vehicle to aid in escape during an emergency is desired.

In light of the devices disclosed in the known art, it is submitted that the present invention substantially diverges in design elements from the known art and consequently it is clear that there is a need in the art for an improvement to existing handrails for recreational vehicles. In this regard, the instant invention substantially fulfills these needs.

SUMMARY OF THE INVENTION

In view of the foregoing disadvantages inherent in the known types of handrails for recreational vehicles now present in the known art, the present invention provides a pivoting handrail with a safety latch wherein the same can be utilized for providing convenience for the user when pivotally adjusting the position of the handrail from within an interior of the recreational vehicle.

The present system comprises a handrail having a first end opposite a second end, wherein the first end is pivotally affixed to an upper bracket and the second end is pivotally affixed to a lower bracket. An upper pin is affixed to the first end, wherein the upper pin is slidably disposed within a first channel within the upper bracket. A lower pin is affixed to the second end, wherein the lower pin is slidably disposed within a second channel within the lower bracket. The handrail is selectively movable between an in-use position and a stowed position upon elevation of the handrail. In some embodiments, the upper pin is spring biased towards a lowered position, such that the handrail locks in place after movement between the in-use position and the stowed position. A safety latch is affixed to a deadbolt, wherein the safety latch is configured to selectively move the deadbolt between an extended position and a retracted position. When in the extended position, the deadbolt extends into the second channel to displace the lower pin from the second channel.

In some embodiments, the handrail extends from a front side of each of the upper and lower brackets when in the in-use position. In another embodiment, each of the upper bracket and the lower bracket comprises a pair of lateral recesses disposed on opposing lateral sides of the upper bracket and the lower bracket, the pair of lateral recesses dimensioned to retain the handrail therein via frictional engagement. In other embodiments, each of the upper bracket and the lower bracket comprises a front recess disposed on a front side of each of the upper bracket and the lower bracket, the front recess dimensioned to retain the handrail therein via frictional engagement. In yet another embodiment, the device further comprises a housing removably securable to the lower bracket, wherein the housing encloses the deadbolt. In some embodiments, the in-use position is substantially perpendicular to the stowed position. In another embodiment, the safety latch extends rearwardly relative to the lower bracket. In other embodiments, the safety latch is disposed on an interior side of a recreational vehicle wall when the upper bracket and the lower bracket are installed on an exterior side of the recreational vehicle wall. In yet another embodiment, the handrail comprises a substantially C-shaped cross-section having an angled upper portion. In some embodiments, a cushioned grip is disposed on the handrail.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
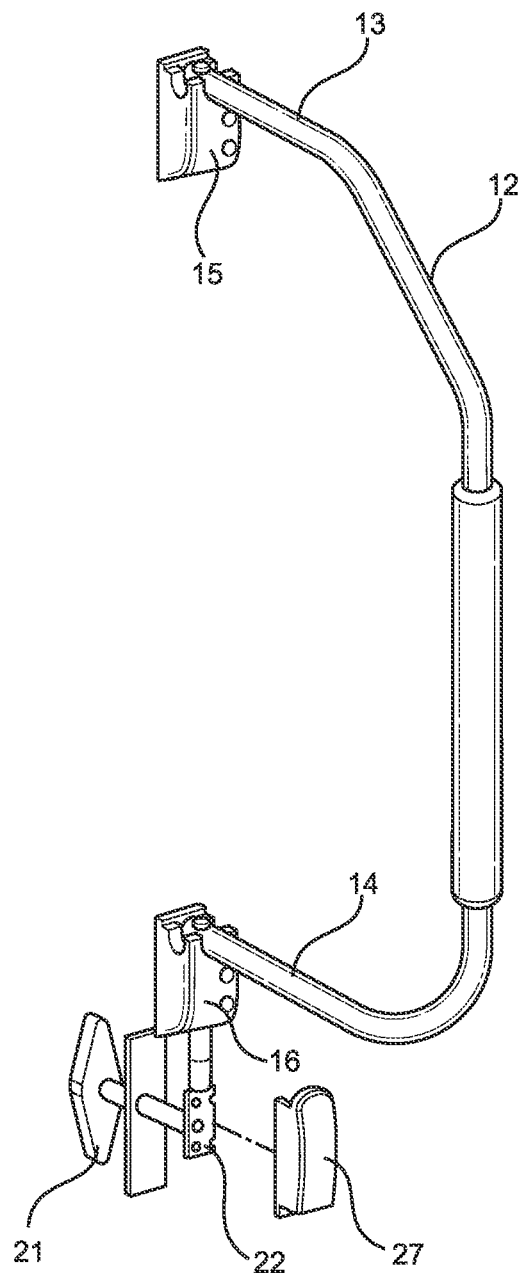
FIG. 1 shows a perspective view of an embodiment of the pivoting handrail with safety latch.

Reference is made herein to the attached drawings. Like reference numerals are used throughout the drawings to depict like or similar elements of the pivoting handrail with a safety latch. The figures are intended for representative purposes only and should not be considered to be limiting in any respect.

Figure 3:
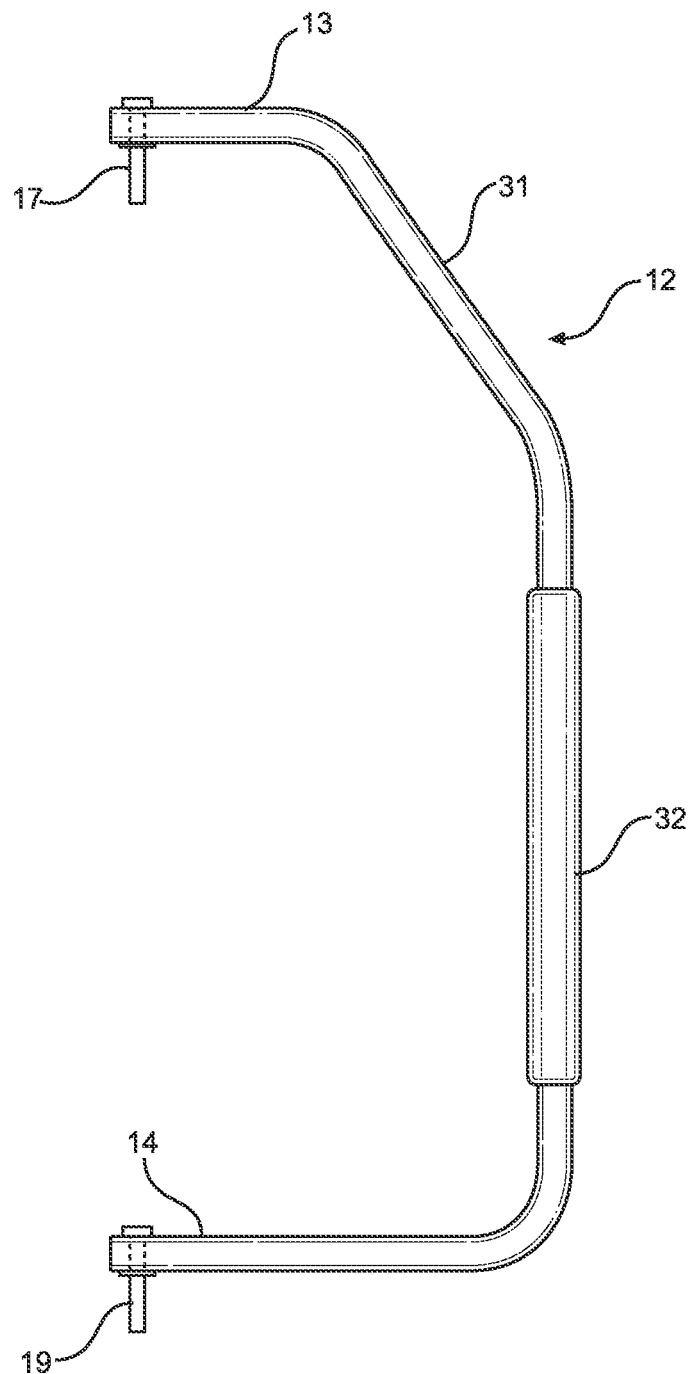
FIG. 3 shows a perspective view of the handrail of an embodiment of the pivoting handrail with safety latch.

Referring now to FIG. 1, there is shown a perspective view of an embodiment of the pivoting handrail with safety latch. The pivoting handrail with safety latch 11 comprises a handrail 12 having a first end 13 opposite a second end 14, wherein the first and second ends 13, 14 are pivotally affixed to each of an upper bracket 15 and a lower bracket 16, respectively. An upper pin (as shown in FIG. 3,17) is affixed to the first end 13 and a lower pin (as shown in FIG. 3,19) is affixed to the second end 14, wherein the upper and lower pins are pivotally secured within the upper and lower brackets 15, 16 to facilitate rotation of the handrail 12 about the upper and lower pins. The handrail 12 is configured to selectively raise and lower relative to the upper and lower brackets 15, 16, wherein the handrail 12 is can pivot about the upper and lower brackets 15, 16 when the handrail 12 is in the raised position. The handrail 12 is configured to selectively move between an in-use position substantially perpendicular to a recreational vehicle wall and a collapsed position substantially parallel to the recreational vehicle wall. In this manner, the pivoting handrail with safety latch 11 can be mounted to the recreational vehicle wall adjacent to a recreational vehicle door to provide a gripping surface for a user when climbing into the recreational vehicle, while stowing alongside the recreational vehicle wall when the handrail 12 is not required.

A safety latch 21 is operably connected to a deadbolt 22, wherein the deadbolt is configured to selectively move between an extended position and a retracted position when the safety latch 21 is actuated. In the shown embodiment, the safety latch 21 comprises a rotating handle. When the deadbolt 22 is in the extended position, the deadbolt 22 raises the handrail 12 to the raised position to allow the handrail 12 to pivot about the upper and lower brackets 15, 16 as further described elsewhere herein. In the shown embodiment, a housing 27 is removably securable to the recreational vehicle wall over the deadbolt 22, such that the housing 27 encloses the deadbolt 22. In this manner, the housing 27 prevents precipitation and debris from interfering with the operation of the deadbolt 22. In the shown embodiment, the housing 27 comprises a front face having a plurality of sidewalls extending therefrom, wherein the plurality of sidewalls rest against the recreational vehicle wall to fully enclose the deadbolt 22. In some embodiments, the plurality of sidewalls is dimensioned to allow the front face to rest flush with a front side of the lower bracket 16. In another embodiment, the housing 27 is unitary with the lower bracket 15, such that the device is a single enclosure to secure over the deadbolt 22.

Figure 2:
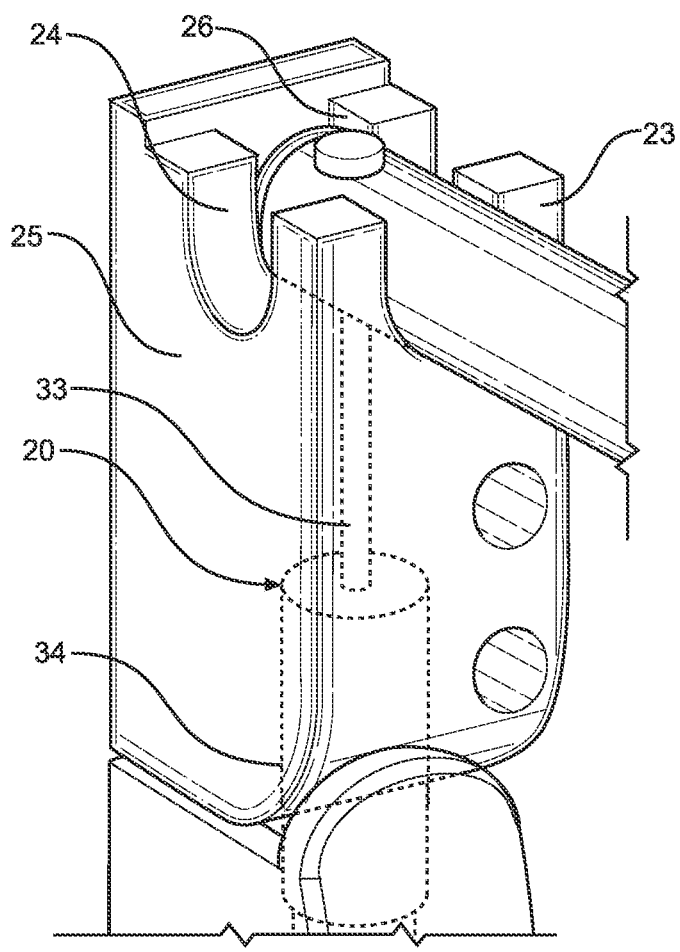
FIG. 2 shows a perspective view of the bracket of an embodiment of the pivoting handrail with safety latch.

Referring now to FIG. 2, there is shown a perspective view of the bracket of an embodiment of the pivoting handrail with safety latch. In the illustrated embodiment, the lower bracket 16 is shown, however, it should be understood that the following discussion can similarly apply to the structure of the upper bracket. In the shown embodiment, the lower bracket 16 comprises a front recess 26 disposed within a front side 23 of the lower bracket 16, wherein the front recess 26 is dimensioned to frictionally engage the handrail when the handrail is in the lowered position. In this manner, the front recess 26 secures the handrail in the in-use position substantially perpendicular to the recreational vehicle wall. Furthermore, in the illustrated embodiment, a pair of lateral recesses 24 are disposed on opposing lateral sides 25 of the lower bracket 16, wherein the pair of lateral recesses 24 are similarly dimensioned to frictionally engage the handrail when the handrail is in the lowered and locked position. In this manner, the pair of lateral recesses 24 retain the handrail in the collapsed position substantially parallel to the recreational vehicle wall when the handrail is not in use. When the handrail is moved to the raised position, the handrail clears the front recess 26 and the pair of lateral recesses 24, such that the handrail is free to pivot about each bracket.

In the shown embodiment, the lower bracket 16 comprises a channel 20 therethrough, wherein the channel 20 is configured to receive the upper or lower pin therethrough. In the shown embodiment, the channel 20 extends through an entirety of the lower bracket 16, such that that deadbolt can enter the channel 20 from a lower side of the lower bracket 16 to displace the pin from the channel 20 and raise the handrail from within the recesses. As the deadbolt is disposed adjacent to only the lower bracket 16, it is contemplated that the channel 20 disposed through the upper bracket does not extend through an entirety thereof and is of sufficient length to house the upper pin when the handrail is in the lowered and locked position. In the illustrated embodiment, the channel 20 further comprises an upper portion 33 and a lower portion 34, wherein the upper portion 33 comprises a smaller diameter than a diameter of the lower portion 34. In this manner, the lower portion 34 is dimensioned to receive the comparatively larger deadbolt therein, while the upper portion 33 prevents the lower pin from shifting laterally within the channel 20. When the handrail is in the lowered and locked position, the lower pin is dimensioned to extend into the lower portion 34 of the channel 20, such that when the deadbolt is extended into the channel 20, the deadbolt displaces the pin from the channel 20 to raise the handrail.

Referring now to FIG. 3, there is shown a perspective view of the handrail of an embodiment of the pivoting handrail with safety latch. The handrail 12 comprises an upper pin 17 affixed through the first end 13 of the handrail 12 and a lower pin 19 affixed through the second end 14 of the handrail 12. The upper and lower pins 17, 19 are removably securable within the channels of each of the upper and lower brackets, respectively, such that the handrail 12 is pivotally adjustable about a longitudinal axis of each of the upper and lower pins 17, 19. In this manner, the upper and lower pins 17, 19 are contemplated to be coaxially aligned. In the shown embodiment, the handrail 12 further comprises a cylindrical construction to provide a comfortable gripping surface while frictionally engaging within the recesses of the upper and lower brackets. Furthermore, in the shown embodiment, the handrail 12 comprises a unitary structure to maximize the structural integrity thereof. In this manner, the handrail 12 can retain its shape over repeated heavy use. In the illustrated embodiment, the handrail 12 further comprises an angled upper portion 31, wherein the angled upper portion 31 provides increased strength to the handrail 12, while also providing an angled gripping surface for a user when climbing into the recreational vehicle. Additionally, in the shown embodiment, a cushioned grip 32 is disposed on the handrail 12, wherein the cushioned grip 32 is affixed along a central portion thereof. The cushioned grip 32 comprises a soft and malleable material configured to provide the user with a comfortable gripping surface. In some embodiments, the cushioned grip 32 further comprises a plurality of finger wells or another ergonomic shape to increase user comfort.

Figure 4:
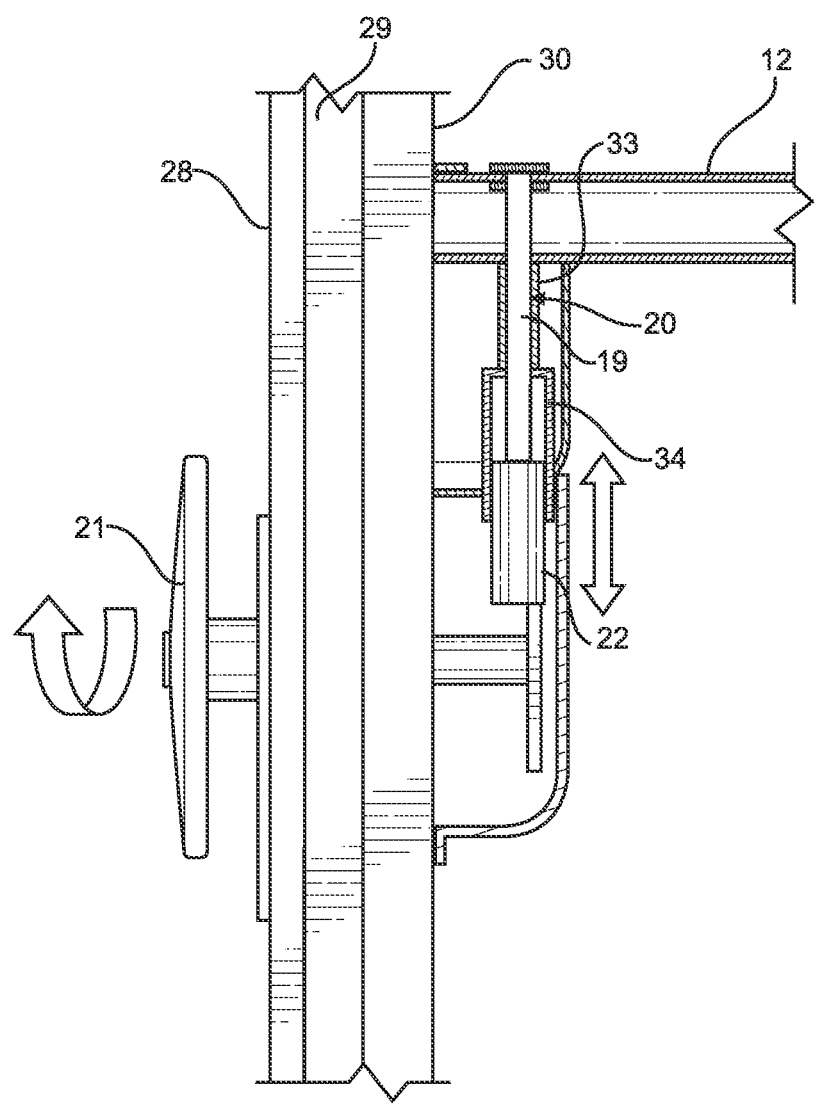
FIG. 4 shows a cross-sectional view of an embodiment of the pivoting handrail with safety latch installed on a recreational vehicle wall.

Referring now to FIG. 4, there is shown a cross-sectional view of an embodiment of the pivoting handrail with safety latch installed on a recreational vehicle wall. In one use, the pivoting handrail with safety latch can be installed on a recreational vehicle wall 29 such that the upper bracket, the lower bracket 16, and the deadbolt 22 are affixed to an exterior side 30 of the recreational vehicle wall 29 and the safety latch 21 is affixed to an interior side 28 of the recreational vehicle wall 29. In this manner, the safety latch 21 is disposed inside the recreational vehicle cabin to operate the handrail 12 from within the recreational vehicle. As the safety latch 21 is rotated, the deadbolt 22 raises into the lower portion 34 of the channel 20 extending through the lower bracket 16. The lower pin 19 extends into the channel 20 through the upper portion 33 and into the lower portion 34 when the handrail 12 is secured in a lowered and locked position. In some embodiments, the upper pin and the lower pin 19 are spring-biased towards the lowered position, such that the handrail locks into position automatically when released by the user, however, in some embodiments, the lower pin 19 is not spring-biased to allow the deadbolt 22 to operably interact with the lower pin 19. In some embodiments, a spring washer is affixed to the each of the upper pin and the lower pin 19, wherein the spring washer is configured to retain each pin within the handrail 12, such that the pins do not shift during operation. When the handrail 12 is in the lowered position, the lower pin 19 extends into the lower portion 34 of the channel 20. When the user wishes to raise the handrail 12 from the locked position from inside the recreational vehicle, the user actuates the safety latch 21 to raise the deadbolt 22 into the lower portion 34. The deadbolt 22 engages the lower pin 19 to displace the lower pin 19 from the channel 20, thereby raising the affixed handrail 12. Once the handrail 12 is in the raised position, the recreational vehicle door can be opened to move the handrail 12 from the collapsed position to the in-use position. In this manner, the user can prevent the handrail 12 from locking in a collapsed position over the recreational vehicle door. This prevents the handrail 12 from effectively locking the user within the recreational vehicle when the handrail 12 is collapsed over the recreational vehicle door. In some embodiments, the safety latch 21 and deadbolt 22 system can be applied to an existing handrail system as an aftermarket kit. In this manner, the user can gain the additional functional benefits of the safety latch 21 with existing handrail systems.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly, and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A pivoting handrail with a safety latch, comprising:
a handrail having a first end opposite a second end;
wherein the first end is pivotally affixed to an upper bracket and the second end is pivotally affixed to a lower bracket;
an upper pin affixed to the first end, the upper pin slidably disposed within a first channel within the upper bracket;
a lower pin affixed to the second end, the lower pin slidably disposed within a second channel within the lower bracket;
wherein the handrail is selectively movable between an in-use position and a stowed position upon elevation of the handrail;
a safety latch affixed to a deadbolt, wherein the safety latch is configured to selectively move the deadbolt between an extended position and a retracted position;
wherein the extended position, the deadbolt extends into the second channel to displace the lower pin from the second channel.

2. The pivoting handrail of claim 1, wherein the handrail extends from a front side of each of the upper and lower brackets when in the in-use position.

3. The pivoting handrail of claim 1, wherein each of the upper bracket and the lower bracket comprises a pair of lateral recesses disposed on opposing lateral sides of the upper bracket and the lower bracket, the pair of lateral recesses dimensioned to retain the handrail therein via frictional engagement.

4. The pivoting handrail of claim 1, wherein each of the upper bracket and the lower bracket comprises a front recess disposed on a front side of each of the upper bracket and the lower bracket, the front recess dimensioned to retain the handrail therein via frictional engagement.

5. The pivoting handrail of claim 1, further comprising a housing removably securable to the lower bracket, wherein the housing encloses the deadbolt.

6. The pivoting handrail of claim 1, wherein the in-use position is substantially perpendicular to the stowed position.

7. The pivoting handrail of claim 1, wherein the safety latch extends rearwardly relative to the lower bracket.

8. The pivoting handrail of claim 7, wherein the safety latch is disposed on an interior side of a recreational vehicle wall when the upper bracket and the lower bracket are installed on an exterior side of the recreational vehicle wall.

9. The pivoting handrail of claim 1, wherein the handrail comprises a substantially C-shaped cross-section having an angled upper portion.

10. The pivoting handrail of claim 1, further comprising a cushioned grip disposed on the handrail.

11. A pivoting handrail with a safety latch, comprising:
a handrail having a first end opposite a second end;
wherein the first end is pivotally affixed to an upper bracket and the second end is pivotally affixed to a lower bracket;
an upper pin affixed to the first end, the upper pin slidably disposed within a first channel within the upper bracket;
a lower pin affixed to the second end, the lower pin slidably disposed within a second channel within the lower bracket;
wherein the handrail is selectively movable between an in-use position and a stowed position upon elevation of the handrail;
wherein the upper pin is spring biased towards a lowered position;
a safety latch affixed to a deadbolt, wherein the safety latch is configured to selectively move the deadbolt between an extended position and a retracted position;
wherein the extended position, the deadbolt extends into the second channel to displace the lower pin from the second channel.

12. The pivoting handrail of claim 11, wherein the handrail extends from a front side of each of the upper and lower brackets when in the in-use position.

13. The pivoting handrail of claim 11, wherein each of the upper bracket and the lower bracket comprises a pair of lateral recesses disposed on opposing lateral sides of the upper bracket and the lower bracket, the pair of lateral recesses dimensioned to retain the handrail therein via frictional engagement.

14. The pivoting handrail of claim 11, wherein each of the upper bracket and the lower bracket comprises a front recess disposed on a front side of each of the upper bracket and the lower bracket, the front recess dimensioned to retain the handrail therein via frictional engagement.

15. The pivoting handrail of claim 11, further comprising a housing removably securable to the lower bracket, wherein the housing encloses the deadbolt.

16. The pivoting handrail of claim 11, wherein the in-use position is substantially perpendicular to the stowed position.

17. The pivoting handrail of claim 11, wherein the safety latch extends rearwardly relative to the lower bracket.

18. The pivoting handrail of claim 17, wherein the safety latch is disposed on an interior side of a recreational vehicle wall when the upper bracket and the lower bracket are installed on an exterior side of the recreational vehicle wall.

19. The pivoting handrail of claim 11, wherein the handrail comprises a substantially C-shaped cross-section having an angled upper portion.

20. The pivoting handrail of claim 11, further comprising a cushioned grip disposed on the handrail.

* * * * *